(12) United States Patent
Aoki et al.

(10) Patent No.: US 7,001,134 B2
(45) Date of Patent: Feb. 21, 2006

(54) REINFORCING FRAME CONSTRUCTION FOR TRACTOR HAVING ROPS

(75) Inventors: Tsuyoshi Aoki, Sakai (JP); Eiji Miyazaki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/652,582

(22) Filed: Aug. 29, 2003

(65) Prior Publication Data

US 2004/0145172 A1 Jul. 29, 2004

(30) Foreign Application Priority Data

Sep. 24, 2002 (JP) ............. 2002-278095
Sep. 24, 2002 (JP) ............. 2002-278096

(51) Int. Cl.
*E02F 3/627* (2006.01)

(52) U.S. Cl. .................... 414/686; 172/272

(58) Field of Classification Search ........... 414/686, 414/694; 172/272–275; 280/781, 785, 796
See application file for complete search history.

(56) References Cited

U.S. PATENT DOCUMENTS

| 4,087,009 A | 5/1978 | Profenna et al. |
| 4,661,036 A | 4/1987 | Horsch |
| 5,000,269 A | 3/1991 | Aoki et al. |
| 5,248,237 A | 9/1993 | Nakamura |
| 6,056,502 A | 5/2000 | Takemura et al. |
| 6,446,367 B1 | 9/2002 | Muramoto et al. |

FOREIGN PATENT DOCUMENTS

| JP | 06-032188 | 2/1994 |
| JP | 10-7014 | 1/1998 |

*Primary Examiner*—Donald W. Underwood
(74) *Attorney, Agent, or Firm*—The Webb Law Firm (57) ABSTRACT

A reinforcing frame construction having ROPS and a rear axle casing projecting to the right and left from a tractor vehicle body. The construction includes a pair of right and left loader attaching members for detachably attaching a front loader, the loader attaching members being connected to an intermediate portion of the vehicle body and projecting therefrom to the lateral sides, a pair of right and left rear supporting members provided in the rear axle casing for supporting right and left legs of the ROPS, and a pair of right and left connecting members to which a rear implement is connected, the connecting members being fitted into the rear axle casing and being detachably connected to the rear supporting members. Extension portions of the connecting members extending forwardly therefrom are detachably connected to the loader attaching members.

12 Claims, 9 Drawing Sheets

REINFORCING FRAME CONSTRUCTION FOR TRACTOR HAVING ROPS

BACKGROUND OF THE INVENTION

1. Field of the Invention

The present invention relates to a reinforcing frame construction for a tractor having ROPS (Roll Over Protect System) for attaching a front loader to an intermediate portion of a tractor body and a rear implement such as a backhoe to a rear portion of the tractor body.

2. Description of the Related Art

In some utility vehicles such as a tractor, in order to increase the rigidity and strength of the vehicle body and also to allow detachable attachment of implements to the front and rear portions of the vehicle body, reinforcing frame members are detachably attached to the right and left sides of the vehicle body.

In a typical conventional reinforcing frame construction of the above-noted type, as known from e.g. the Japanese Patent Application "Kokai" No.: Hei. 6-32188, a pair of right and left connecting members for connecting a rear implement are fixed to a rear axle casing projecting to the right and left from the tractor body. The upper portions of these right and left connecting members include frame receiving portions capable of receiving right and left legs of the ROPS, with the right left legs of the ROPS and the receiving portions being detachably connected to each other and also with the right and left connecting portions being connected to each other via an angular pipe.

Further, according to a reinforcing frame construction known from the Japanese Patent Application "Kokai" No.: Hei. 10-7014, the construction includes right and left side frame members extending along the length of the vehicle body on the right and left sides of thereof, a cross bar member for interconnecting at least one of front, rear and intermediate portions of the right and left side frame members, a front connecting mechanism for connecting the front portion of the construction to the front portion of the vehicle body, a rear connecting mechanism for connecting the rear portion of the construction to the rear portion of the vehicle body, a loader attaching mechanism for allowing attachment of a front loader and/or an implement attaching mechanism for allowing attachment of a rear implement. And, to the rear portion of this reinforcing frame construction, stays of the ROPS are connected.

In both of the two conventional constructions described above, the reinforcing frame construction is detachably fixed to the tractor vehicle body and the ROPS is attached to this reinforcing frame construction. Hence, it is necessary to provide the tractor vehicle body with an attaching portion for the reinforcing frame construction. Then, if it is desired to use the tractor vehicle body alone, with detachment of the reinforcing frame construction therefrom, as occurs in the case of a towing operation using a drawbar hitch, an attaching member will be separately needed for the attachment of the ROPS. In this respect, there remains room for improvement.

SUMMARY OF THE INVENTION

A primary object of the present invention is to provide a reinforcing frame construction for a tractor having ROPS, which construction solves the above-described problem of the prior art.

For accomplishing the above object, according to one aspect of the present invention, there is provided a reinforcing frame construction having ROPS and a rear axle casing projecting to the right and left from a tractor vehicle body, the construction comprising: a pair of right and left loader attaching members for detachably attaching a front loader, the loader attaching members being connected to an intermediate portion of the vehicle body and projecting therefrom to the lateral sides; a pair of right and left rear supporting members provided in the rear axle casing for supporting right and left legs of the ROPS; and a pair of right and left connecting members to which a rear implement is connected, the connecting members being fitted into the rear axle casing and being detachably connected to the rear supporting members; wherein extension portions of the connecting members extending forwardly therefrom are detachably connected to the loader attaching members.

With this construction, without having to provide the vehicle body with the attaching portion for the reinforcing frame construction, the construction including e.g. the connecting members for reinforcing the vehicle body and also for connecting the rear implement may remain attached to the vehicle body and the ROPS, front loader etc. may be used even with detachment of this construction.

According to one preferred embodiment of the present invention, said rear supporting members and said connecting members are connected to each other at both front and rear regions of said rear axle casing. With this, the connection strength between the rear supporting members and the connecting members can be increased advantageously.

According to a further preferred embodiment of the present invention, at least one of the connection between the rear axle casing and the rear supporting members, the connection between the loader attaching members and the connecting members and the connection between the rear supporting members and the connecting members includes a connection reinforcing member for reinforcing said connection. With this, the connection or interconnection between the two components can be reinforced.

According to a still further preferred embodiment of the present invention, said connecting members are disposed between the vehicle body and said rear supporting members, each said connecting member being fitted to the rear axle casing from the under via an upper-open fit-in recess of the connecting member; and a fit-in recess reinforcing member is provided for connecting front and rear peripheral portions of said fit-in recess fitted to the rear axle casing to an upper portion of the rear axle casing. With this, the attachment of the connecting members to the rear supporting members is made possible without necessitating disassembly of the rear supporting members and rear wheels of the vehicle. Hence, the attachment/detachment of the construction such as the connecting members can be facilitated.

For accomplishing the above object, according to another aspect of the present invention, there is provided a reinforcing frame construction having ROPS and a rear axle casing projecting to the right and left from a tractor vehicle body, the construction comprising: a pair of right and left loader attaching members for detachably attaching a front loader, the loader attaching members being connected to an intermediate portion of the vehicle body and projecting therefrom to the lateral sides; a pair of right and left rear supporting members provided in the rear axle casing for supporting right and left legs of the ROPS; a pair of right and left side frame members having front ends thereof detachably attached to the loader attaching members and having rear ends thereof detachably attached to the rear supporting members; and a pair of right and left connecting members to which a rear implement is connected, the connecting members being fitted to the rear axle casing, wherein said connecting members are detachably connected to said side frame members and said rear supporting members.

With this construction, without having to provide the vehicle body with the attaching portion for the reinforcing frame construction, the construction including e.g. the connecting members for reinforcing the vehicle body and also for connecting the rear implement may remain attached to the vehicle body and the ROPS, front loader etc. may be used even with detachment of this construction.

According to one preferred embodiment of the present invention, said right and left rear supporting members, said side frame members and said connecting members are bolt-connected together. With this, the inter-connection of the three components, i.e. the rear supporting members, the side frame members and the connecting members can be readily carried out.

According to a further preferred embodiment of the present invention, the connection between the loader attaching members and the side frame members includes a connection reinforcing member for reinforcing said connection. With this, the interconnection therebetween can be reinforced.

Further features and advantages of the present invention will become apparent upon reading the following detailed disclosure of the invention with reference to the accompanying drawings.

DESCRIPTION OF THE PREFERRED EMBODIMENTS

Next, a first embodiment of the invention will be described with reference to FIGS. 1–5.

Figure 1:
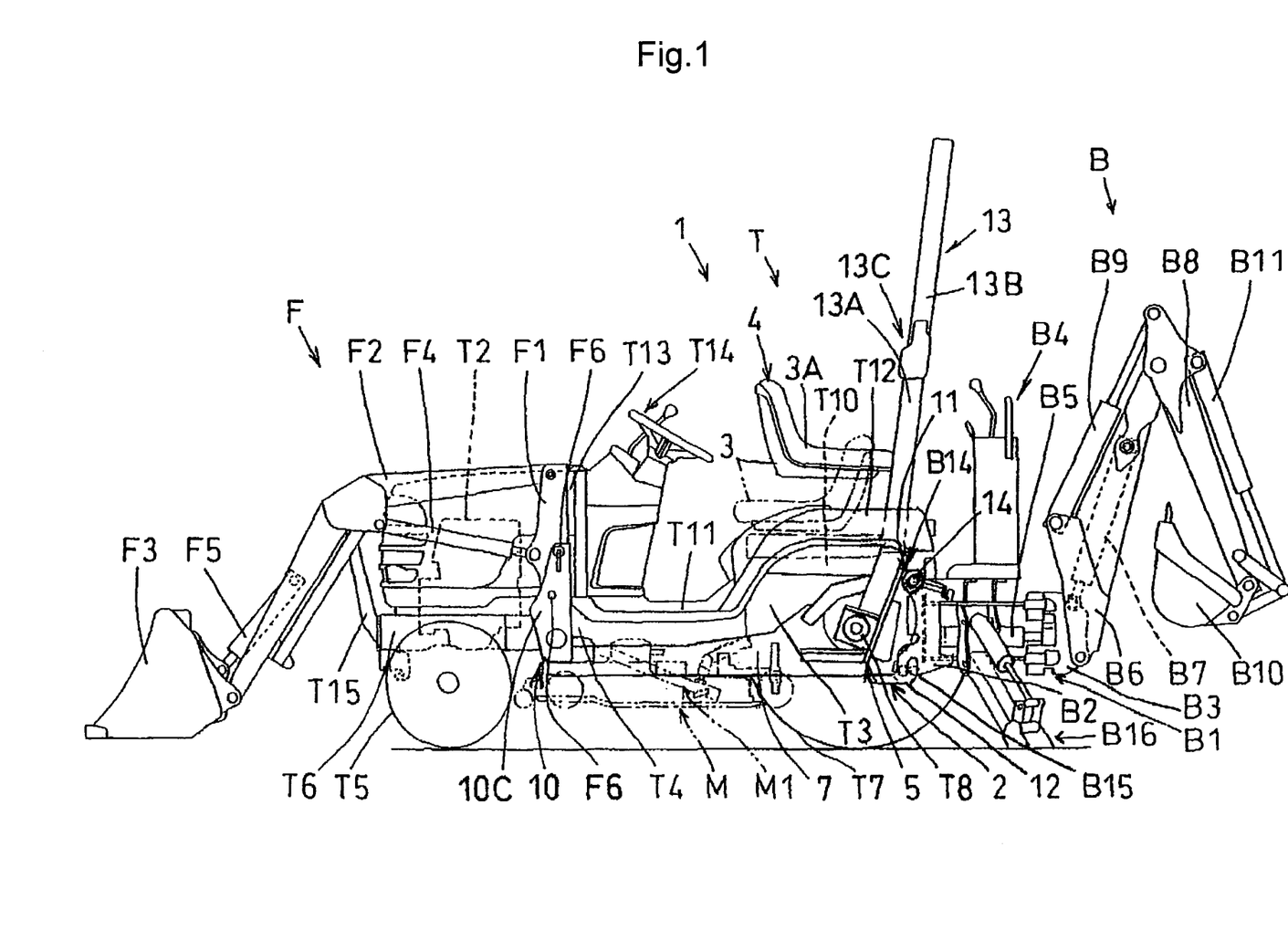
FIG. 1 is a schematic overall side view showing a tractor/loader/backhoe (TLB) implementing a first embodiment of a reinforcing frame construction relating to the present invention.

In FIG. 1, numeral 1 denotes a tractor/front loader/backhoe (TLB). A tractor body T is reinforced by a pair of right and left reinforcing frames 2. To an intermediate portion of the body T, there is detachably attached a front loader F extending forwardly therefrom. The tractor body T also detachably mounts at the rear portion thereof a backhoe B as a rear implement. The tractor body T is capable of mounting also, at an intermediate lower portion thereof, a mid-mount mower M.

The tractor body T includes a main body formed by interconnecting along the fore and aft direction an engine T2, a clutch housing T4 and a transmission casing T3, a front axle frame T6 for suspending a front axle casing for front wheels T5 projecting forwardly of the engine T2 and a rear axle casing T8 projecting from the rear of the transmission casing T3 for suspending rear wheels T7 on the right and left sides.

On the top of the transmission casing T3, there is mounted an implement lifting hydraulic device T10. And, upwardly of this hydraulic device T10, there is mounted a driver's cabin 4 including a driver's seat 3 reversible between the forward and rearward orientations. A floor sheet T11 is provided to extend from under the driver's seat 3 to a control console T14. On the right and left sides of this floor sheet T11, there are attached fenders T12 for the rear wheels T7.

To the right and left rear axle casing T8, there are detachably attached, via bolts, a pair of right and left supporting members 5 for supporting right and left legs 13A of ROPS (Roll Over Protect System) 13. In this ROPS 13, the right and left legs 13A are connected to each other via a cross member and to upper portions of the right and left legs 13A, there are attached lower opposed ends of a main frame body 13A formed of a pipe member in a one-side open rectangle shape, via a bent portion 13C, so that the ROPS is foldable via the bent portion 13C and a free space is assured for a driver as seated at the driver's seat 3.

Mark T13 denotes a hood for covering the engine T2, and rearwardly of the hood T13, the driver's cabin T14 is provided. Further, at the front end of the front axle frame T6, there is provided a protector T15 for protecting the engine hood T13.

Referring to the front loader F, right and left stays F1 thereof vertically pivotally support a base of a boom F2. The boom F2 pivotally supports a bucket F3 so that the bucket F3 can be pivoted up and down for scooping and dumping operations. A boom cylinder F4 is provided for hydraulically driving the boom F2 and a bucket cylinder F5 is provided for hydraulically driving the bucket F3.

The stay F1 is configured to be engaged into from the top of a stay receiving member 10C of a loader attaching member 10 to be stopped at the bottom end thereof and locked at an intermediate portion thereof by means of a lock pin F6. When out of use, the front loader F can be detached from the loader attaching member 10 by pulling out the lock pin F6.

The mid-mount mower M is mounted to the underside of the tractor body T via a suspension means M1 to be movable up and down. In response to transmission of power from the transmission casing T3, a blade of the mower M is driven to rotate. When a loader operation and/or a backhoe operation is to be effected, this mid-mount mower M can be removed together with the suspension means M1 from the tractor vehicle body T.

The backhoe B includes a pair of right and left attaching members B2 provided at the front of a base frame B1. The base frame B1 pivotally supports, at a rear portion thereof, a pivot bracket B3 to be pivotable about a vertical axis. The base frame B1 mounts thereon a steering device B4 which can be operated from the driver's seat 3 when oriented rearward. The base frame B1 also mounts, on the right and left sides thereof, hydraulic driven outriggers (stabilizers) B16.

The pivot bracket B3 can be swung to the right or the left by means of a single swing cylinder B5. As bases of the boom B6 and the boom cylinder B7 are pivotally supported to this pivot bracket B3, the boom B6 is vertically pivotable by the boom cylinder B7. Further, the boom B6 supports at the leading end thereof an arm B8, so that the arm B8 can be vertically pivotable by an arm cylinder B9. The arm B8 pivotally supports at the leading end thereof a bucket B10, so that the bucket B10 can be pivotally driven by a bucket cylinder B11 for effecting scooping and dumping operations.

Each of the right and left attaching members B2 of the backhoe B includes upper and lower engaging portions B14, B15, and these upper and lower engaging portions B14, B15 are detachably connected to each of right and left upper and lower connecting portions 11, 12 at the rear end of the reinforcing frame 2, for allowing attachment and detachment of the backhoe B to and from the tractor vehicle body T.

The upper engaging portion B14 and the upper connecting portion 11 are pin holes which are disposed coaxial opposition to each other for allowing insertion of a pin 14 therein. The lower engaging portion B15 comprises a pin (connecting bar) extending to the right and left. The lower connecting portion 12 comprises an upper open hook (recess), so that with engagement of the pin of the lower engaging portion B15 in this hook-like lower connecting portion 12, the attaching members B2 are pivoted and the upper engaging portion B14 and the upper connecting portion 11 are brought into opposition to each other to allow insertion of the pin 14.

Incidentally, a pin can be provided to the upper connecting portion 11 and a mounting device can be provided to the upper engaging portion B14 for automatically engaging with this pin. Further, in this embodiment, the lower connecting portion 12 is formed by welding a thick plate to a connecting member 7 to be described later herein. Instead, the lower connecting portion 12 can be formed integral with the connecting member 7.

Figure 2:
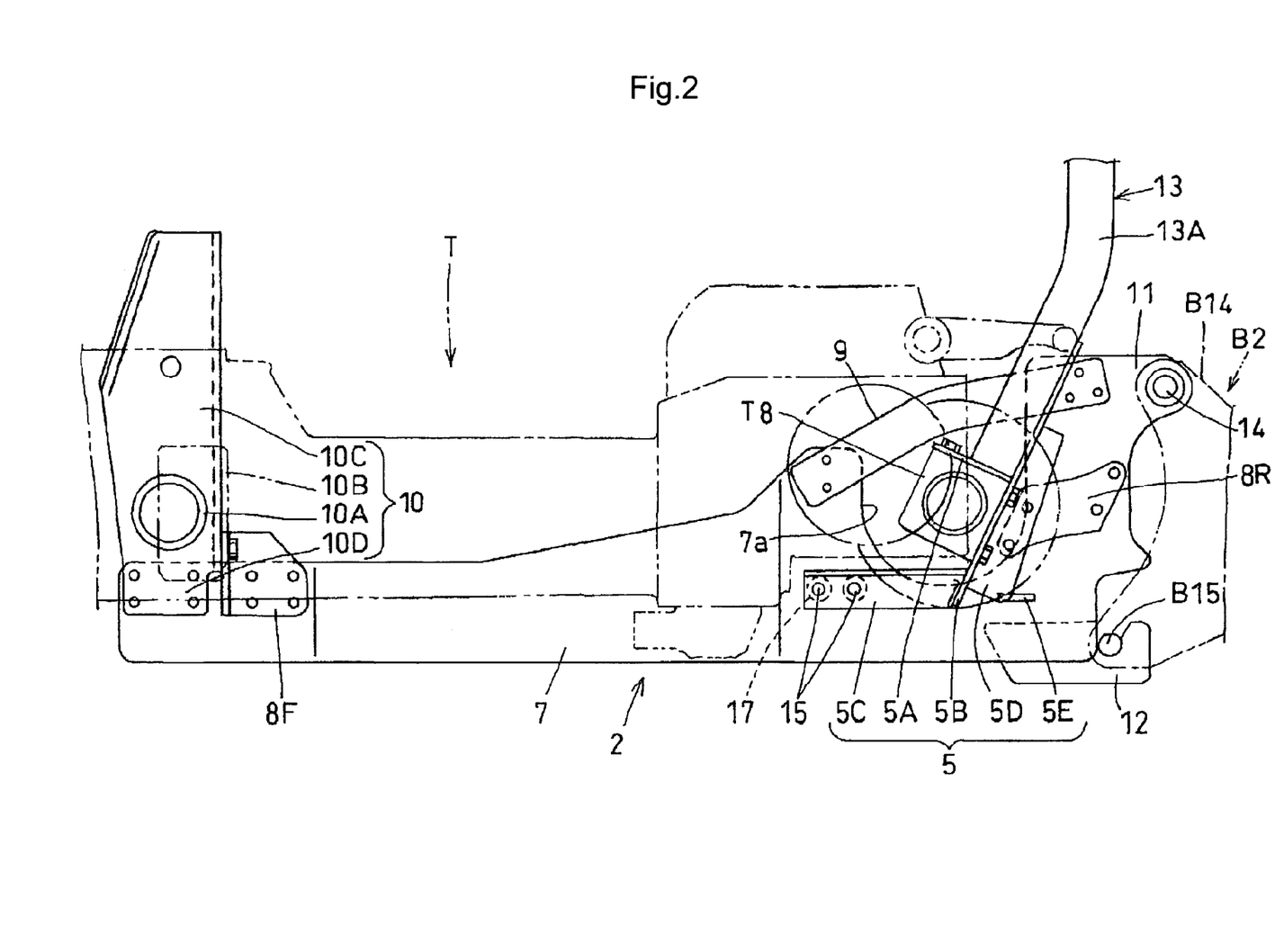
FIG. 2 is a side view of the first embodiment of the reinforcing frame construction relating to the present invention.

Next, with reference to FIGS. 1, 2 and 3, the attaching construction of the above-described reinforcing frame 2 will be described in greater details.

The rear axle casing T8 projecting to the right and left from the vehicle body T includes a pair of right and left rear supporting members 5 for supporting the right and left legs 13A of the ROPS 13. At an intermediate position of the tractor vehicle body T in the fore and aft direction thereof, there are provided a pair of right and left loader attaching members 10 for detachably attaching the front loader F and the connecting members 7 are provided for interconnecting the rear support members 5 and the loader attaching members 10.

Referring to the rear supporting member 5, to a bottom plate 5A fixedly attached to the lower end of the leg 13A, there is fixedly attached a back plate 5B fixedly attached to a lower back face of the leg 13A. An attaching plate 5C formed of an angle member projects forwardly from the lower portion of the back plate 5B. Further, a fin plate 5D is fixedly attached to the back plate 5B with the fin plate projecting rearwardly therefrom. And, at a lower portion of this fin plate 5D, there is formed a check chain connecting portion 5E.

Further, in this rear supporting member 5, the bottom plate 5A is attached to the rear axle casing T8 and the back plate 5B is attached to the back face of the casing, with these plates being fixed to the casing by means of a plurality of bolts. And, as the right and left legs 13A of the ROPS 13 are inclined rearwardly, the rear supporting member 5 is also attached with rearward inclination.

The loader attaching member 10 includes a bracket 10B attached to an inner end portion of a horizontally oriented tubular member 10A on the side of the tractor body T. The attaching member 10 further includes, at an outer end thereof, the stay receiving member 10C having a substantially one-side open rectangle shape in its plan view and also includes a connecting piece 10D formed integral with and projecting downward from the stay receiving member 10C. As the attaching brackets 10B are bolt-fixed to attaching portions T16 formed in the tractor body T, the loader attaching members 10 are attached to the tractor body T to project to the right and left relative thereto.

Each of the right and left connecting members 7 for connecting the rear implement B has a length extending from the rear supporting member 5 to the loader attaching member 10 and has a reduced vertical width in the front half portion thereof. And, the connecting member 7 is bolt-connected to the connecting piece 10D of the loader attaching member 10 and is connected also to the stay receiving member 10C via a connection reinforcing member 8F having a substantially "L"-shape in its plan view, for reinforcing the connection therebetween.

Further, the connecting member 7 has an increased vertical width in the rear half portion thereof and includes here the pair of upper and lower connecting portions 11, 12, so that the connecting member 7 is connected to the fin plate 5D of the rear supporting member 5 via a connection reinforcing member 8R.

Adjacent the rear portion of the connecting member 7, there is formed an upper open fit-in recess 7A. So that, with fitting of the fit-in recess 7*a* to the rear axle casing T8 from the under, the connecting member is disposed between the tractor body T and the rear supporting member 5 in the right and left direction.

Further, when this connecting member 7 is fitted to the rear axle casing T8, a fit-in recess reinforcing member 9 connects front and rear portions of the fit-in recess 7*a* on the upper side of the rear axle casing T8, thereby to avoid strength deterioration due to the formation of the fit-in recess 7*a*. The fit-in recess reinforcing member 9 comprises a tie plate having a substantially upwardly convex dogleg-like shape, so as to avoid physical interference with the rear axle casing T8.

Further, an intermediate portion of the connecting member 7 is fastened by means of bolts 15 to the attaching plate 5C of the rear supporting member 5. More particularly, with interposing a spacer 17 between the connecting member 7 and the attaching plate 5C, the bolts 15 are inserted through the connecting member 7, the attaching plate 5C and the spacer 17 and then fastened by nuts.

Figure 3:
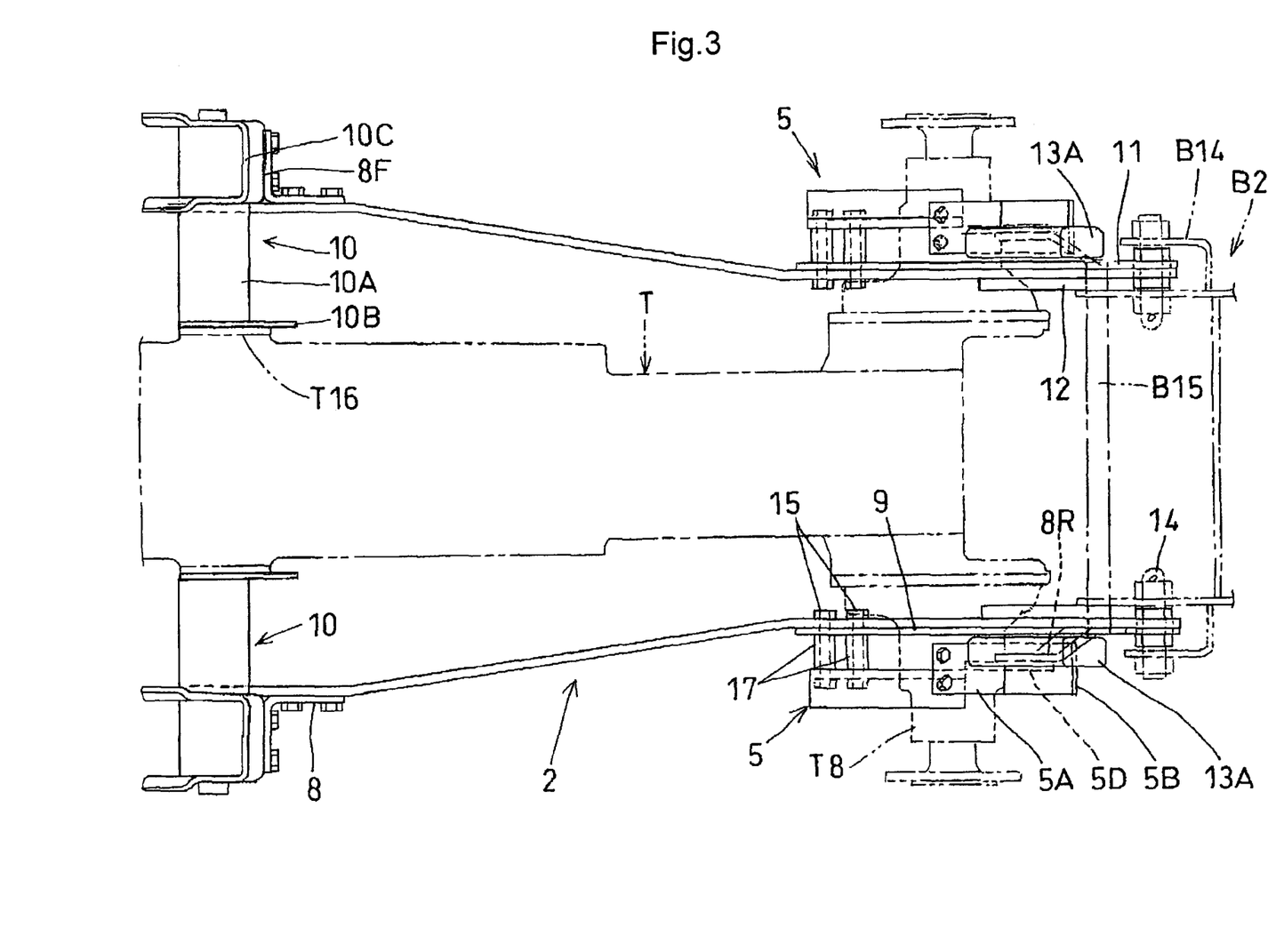
FIG. 3 is a plan view of the first embodiment of the reinforcing frame construction relating to the present invention.

As shown in the plan view of FIG. 3, the portion of the connecting member 7 extending between its portion connected by the bolts 15 and the portion adjacent the rear of the connection reinforcing member 8F has a dogleg shape. And, the front portion of the connecting member 7 is connected to the loader attaching member 10 distant from the tractor body T and the rear portion of the member 7 is attached to the rear supporting member 5 adjacent the tractor body T.

As described above, each connecting member 7 is attached to the rear supporting member 5 and the loader attaching member 10 at total three positions. In this regard, it is preferred that the bolt through holes be formed as elongated holes or slots for allowing adjustment of each attached position.

The connections of the members such as the connecting members 7, the connection reinforcing members 8F, 8R and so on are all bolt fastening connections for allowing detachable attachment. Hence, each of these members constituting the reinforcing frame 2 can be detached and attached, with the rear supporting members 5 and the loader attaching members 10 being kept attached to the tractor body T. Further, these members function to reinforce the tractor body T without being directly attached to this tractor body T.

Figure 4:
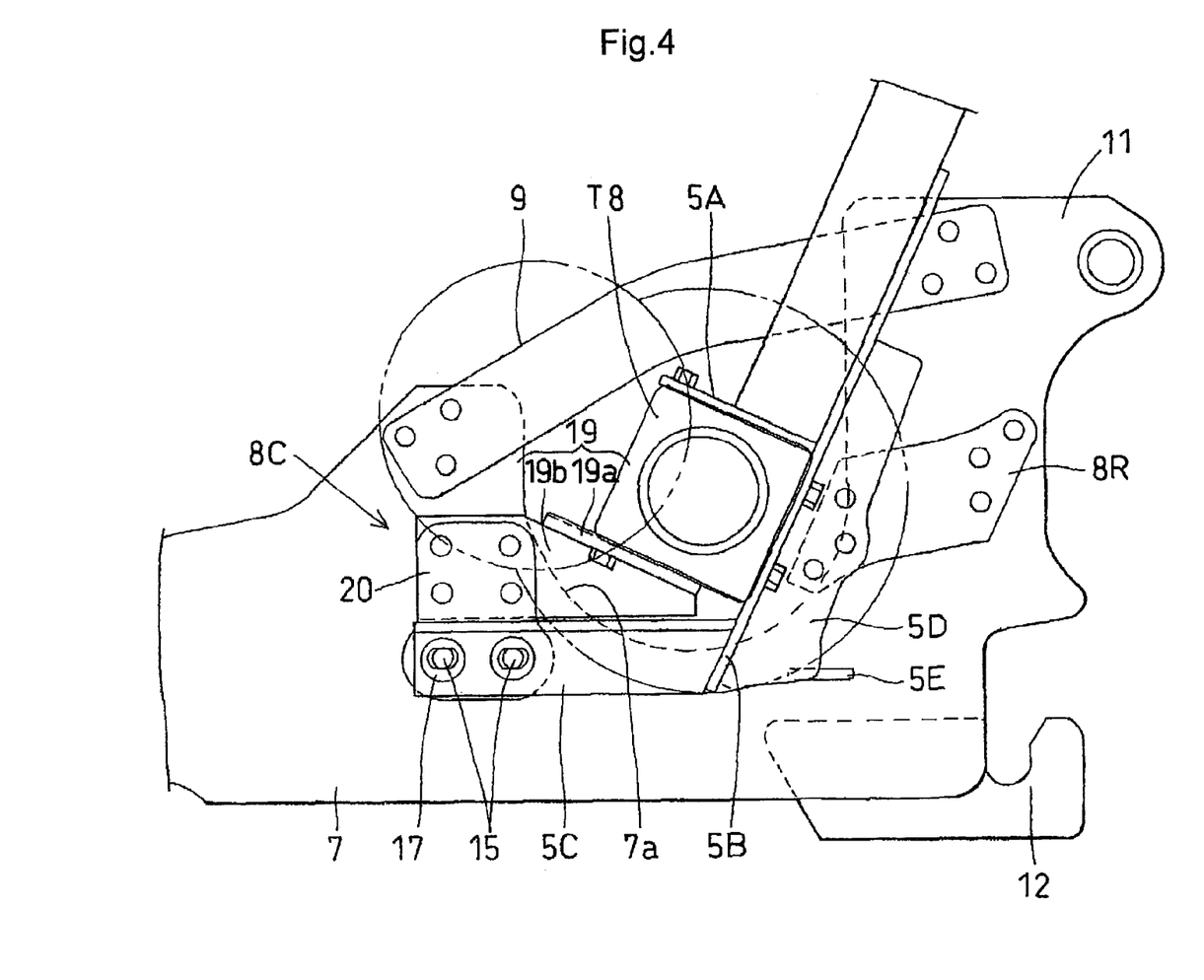
FIG. 4 is a side view showing a modified construction including a connection reinforcing member.
Figure 5:
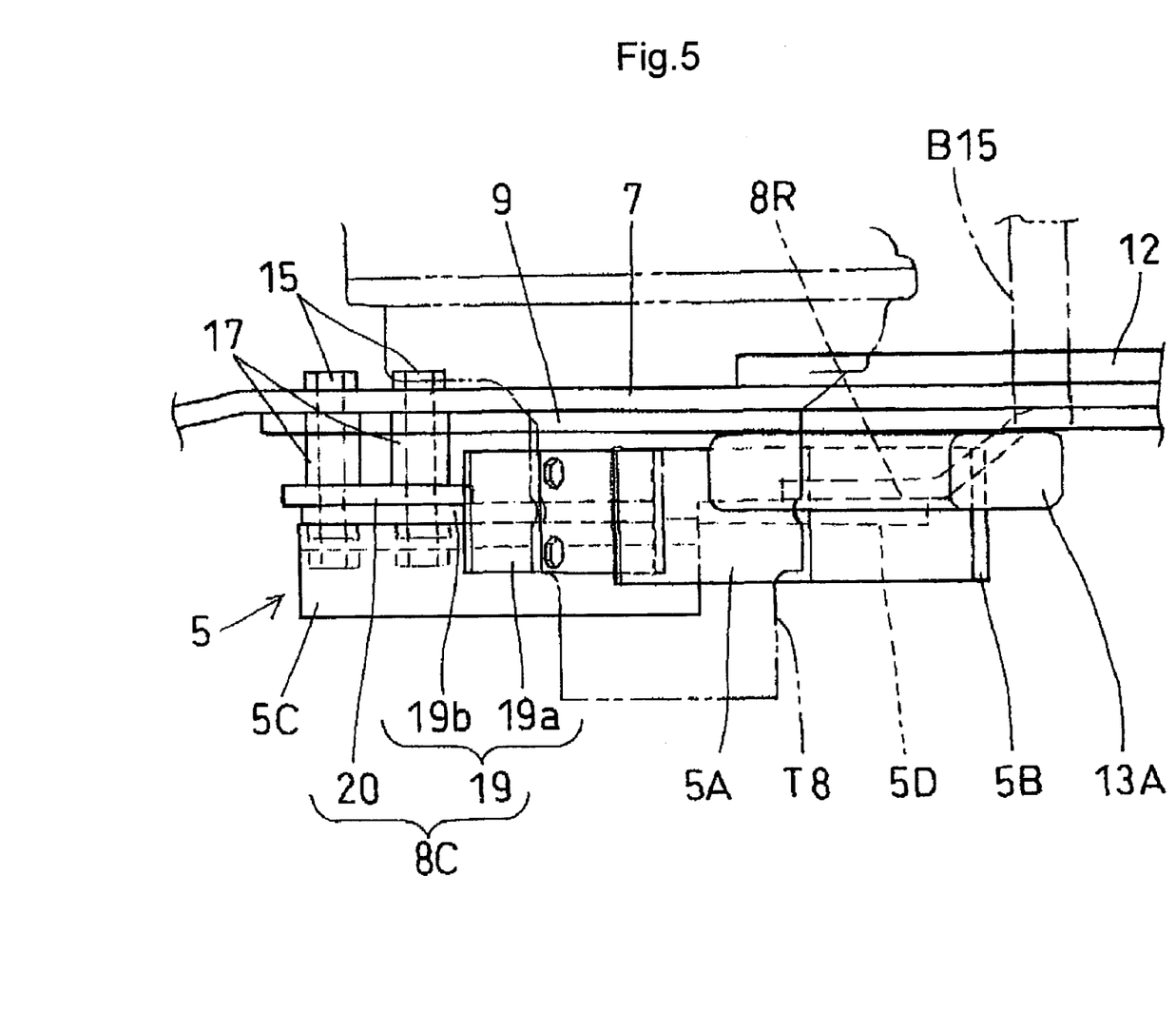
FIG. 5 is a plan view showing the modified construction including the connection reinforcing member.
Figure 6:
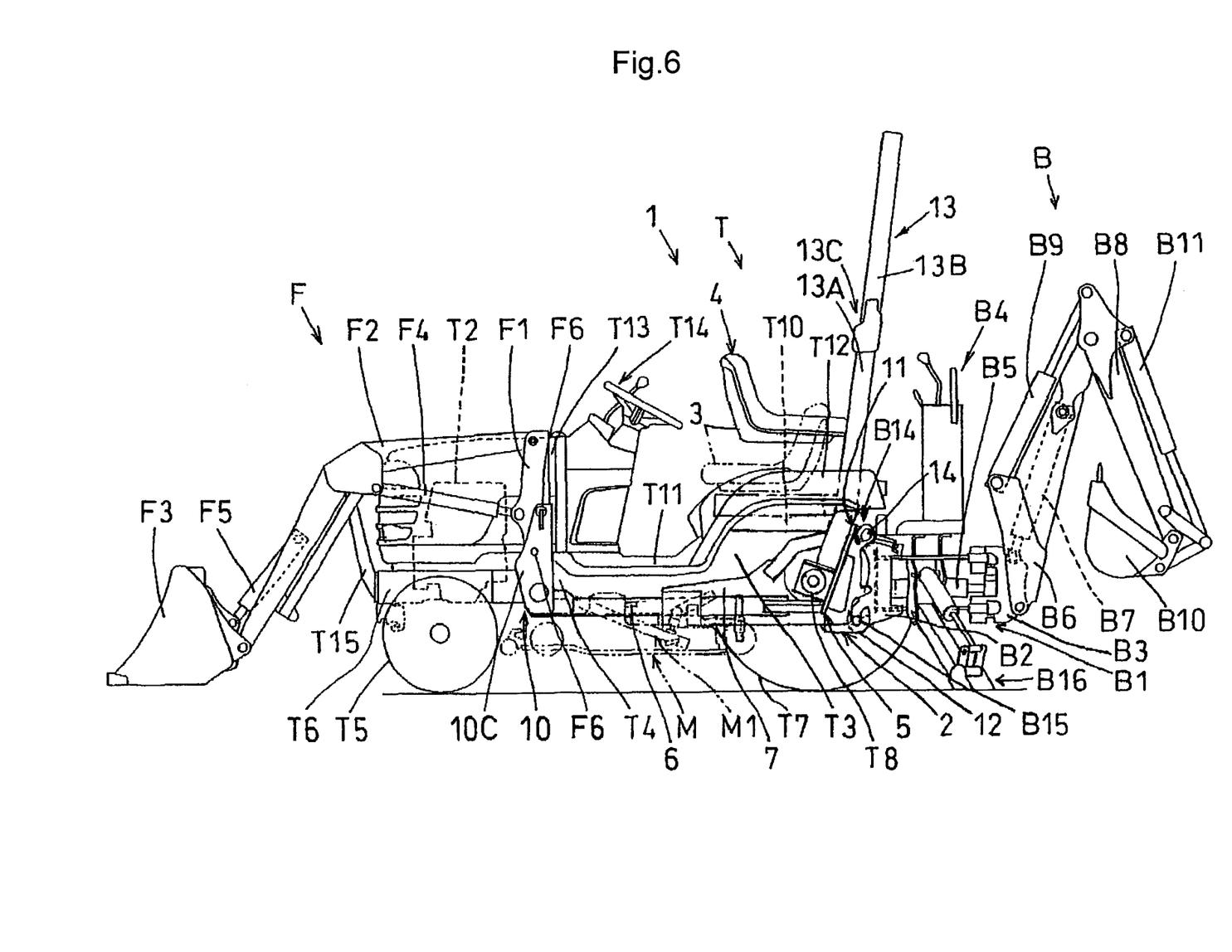
FIG. 6 is a schematic overall side view showing a tractor/loader/backhoe (TLB) implementing a second embodiment of a reinforcing frame construction relating to the present invention.

FIGS. 4 and 5 show a modified construction including an intermediate connection reinforcing member 8C. This intermediate connection reinforcing member 8C includes a connecting bracket 19 and a supporting bracket 20. The connecting bracket 19 is formed by fixedly and perpendicularly attaching a vertical plate 19b to a bottom plate 19a bolt-fixed to the bottom face of the rear axle casing T8. The supporting bracket 20 comprises a single flat plate. To an upper portion of this flat plate, the vertical plate 19b of the connecting bracket 19 is bolt-fixed and a lower portion of the flat plate is fixed between a side frame member 6 and the connecting member 7 and fastened together therewith. The spacer 17 may be formed integrally with a lower portion of the supporting bracket 20.

The intermediate connection reinforcing member 8C is position adjustable in the fore and aft direction, the right and left direction as well as in the vertical direction between the bottom plate 19a and the rear axle casing T8 and between the vertical plate 19b and the supporting bracket 20 and fixed thereto with appropriate position adjustments. As such, this intermediate connection reinforcing member 8C can add to the attachment strength of the rear supporting member 5 to the rear axle casing T8 and also the attachment strength of the connecting member 7 to the rear supporting member 5.

Accordingly, with the above construction, the connecting member 7 is connected to the rear supporting member 5 both at the front and rear portions relative to the rear axle casing 8. Further, as the connecting member 7 can be more firmly supported to the rear axle casing T8, the connection supporting strength for the rear implement B can be improved also.

Next, a second embodiment of the present invention will be described with reference to FIGS. 6 through 9.

In the first embodiment described above, the forwardly extending extension of the connecting member 7 is detachably connected to the loader attaching member 10. In this second embodiment, the connecting member 7 and the rear supporting member 5 are detachably connected to each other via the side frame member 6.

FIGS. 6, 7, 8 and 9 show an attaching construction of the reinforcing frame 2 having such side frame members 6. The rear axle casing T8 projecting to the right and left from the vehicle body T includes a pair of right and left rear supporting members 5 for supporting the right and left legs 13A of the ROPS 13. At an intermediate position of the tractor vehicle body T in the fore and aft direction thereof, there are provided a pair of right and left loader attaching members 10 for detachably attaching the front loader F. And, the side frame member 6 and the connecting member 7 are provided for interconnecting the rear support members 5 and the loader attaching members 10.

Figure 7:
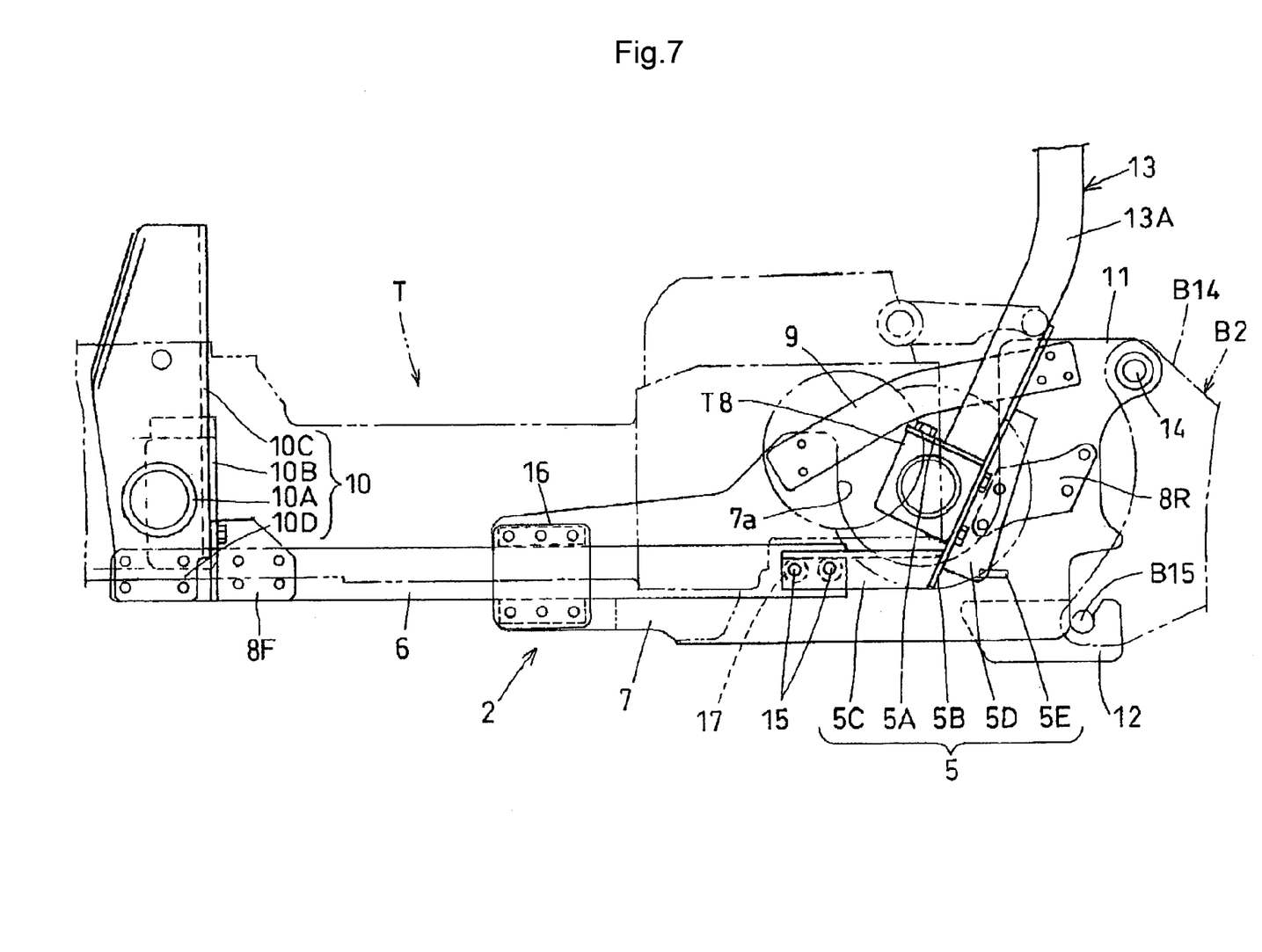
FIG. 7 is a side view of the second embodiment of the reinforcing frame construction relating to the present invention.
Figure 8:
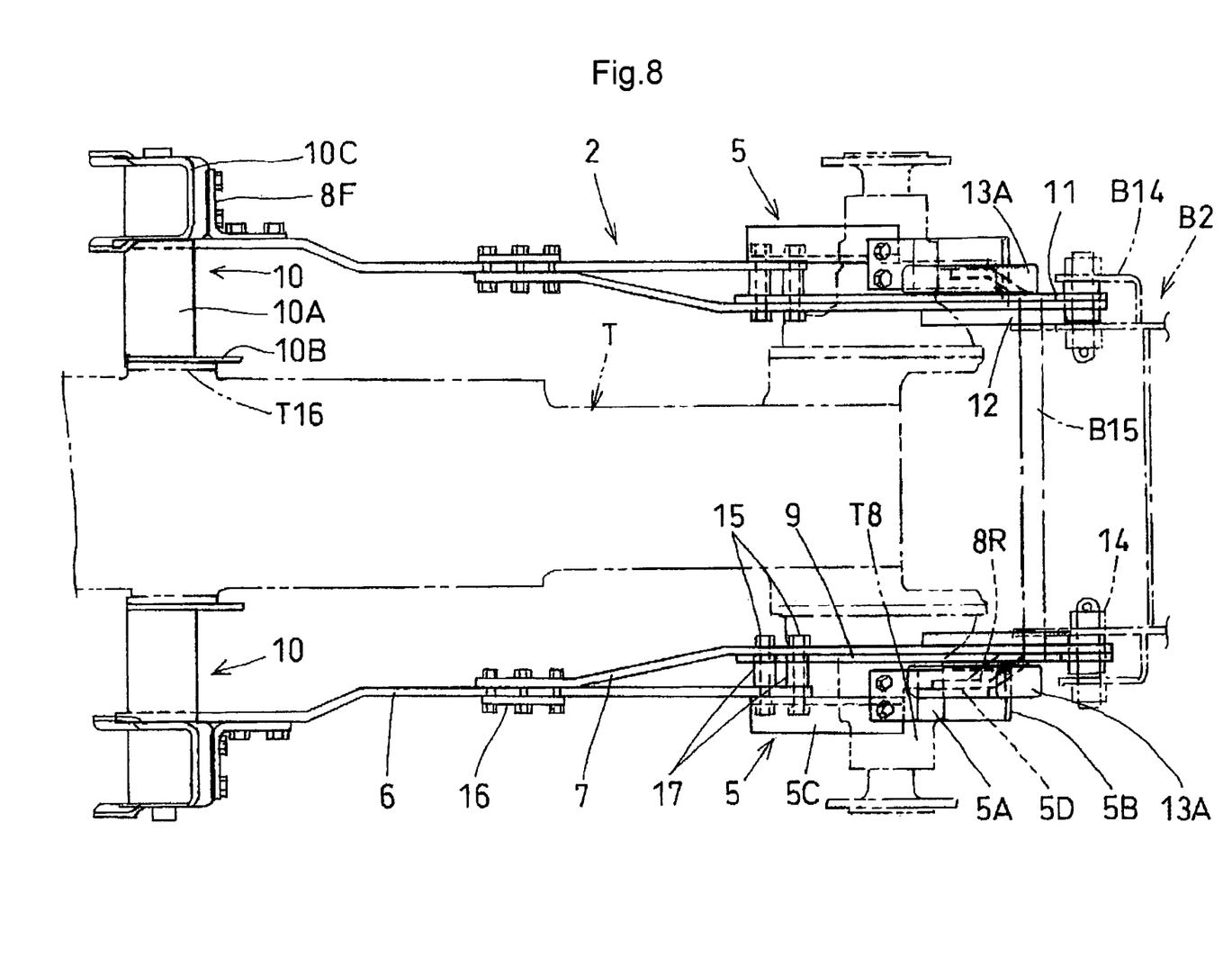
FIG. 8 is a plan view of the second embodiment of the reinforcing frame construction relating to the present invention.
Figure 9:
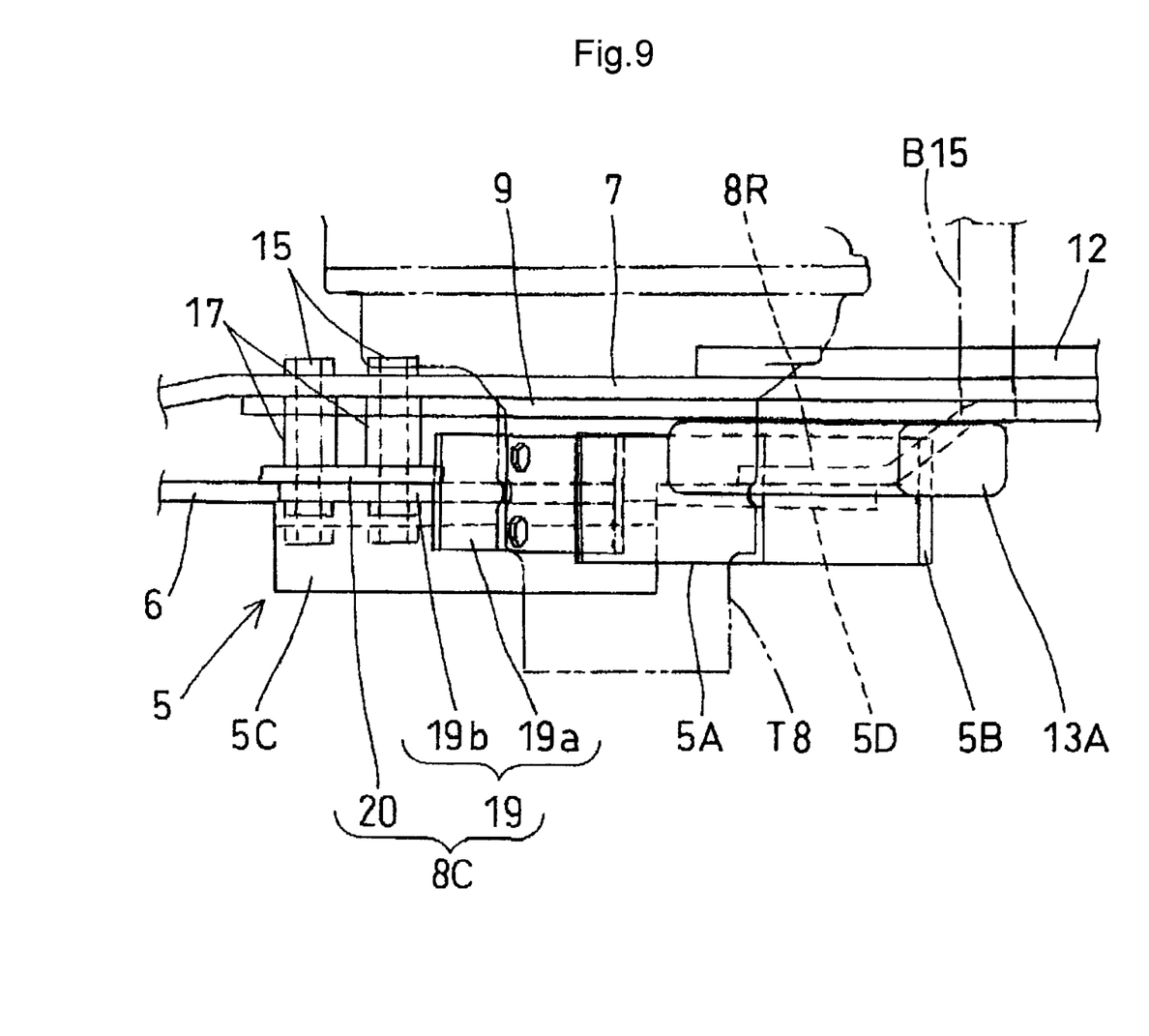
FIG. 9 is a side view showing a modified construction including a connection reinforcing member.

Referring to the rear supporting member 5, to a bottom plate 5A fixedly attached to the lower end of the leg 13A, there is fixedly attached, in the shape of letter "T", a back plate 5B fixedly attached to a lower back face of the leg 13A. An attaching plate 5C formed of an angle member projects forwardly from the lower portion of the back plate 5B. Further, a fin plate 5D is fixedly attached to the back plate 5B with the fin plate projecting rearwardly therefrom. And, at a lower portion of this fin plate 5D, there is formed a check chain connecting portion 5E.

Further, in this rear supporting member 5, the bottom plate 5A is attached to the rear axle casing T8 and the back plate 5B is attached to the back face of the casing, with these plates being fixed to the casing by means of a plurality of bolts. And, as the right and left legs 13A of the ROPS 13 are inclined rearwardly, the rear supporting member 5 is also attached with rearward inclination.

The loader attaching member 10 includes a bracket 10B attached to an inner end portion of a horizontally oriented tubular member 10A on the side of the tractor body T. The attaching member 10 further includes, at an outer end thereof, the stay receiving member 10C having a substantially one-side open rectangle shape in its plan view and also includes a connecting piece 10D formed integral with and projecting downward from the stay receiving member 10C. As the attaching brackets 10B are bolt-fixed to attaching portions T16 formed in the tractor body T, the loader attaching members 10 are attached to the tractor body T to project to the right and left relative thereto.

Further, an intermediate portion of the connecting member 7 is fastened by means of bolts 15 for connecting the rear supporting member 5 to a rear portion of the side frame member 6. More particularly, with interposing a spacer 17 between the side frame member 6 and the connecting member 7, the bolts 15 for connecting the attaching plate 5c of the rear supporting member 5 to the side frame member 6 are inserted through the connecting member 7 and the spacer 17 also and then fastened by nuts.

Each of the right and left side frame members 6 is bent in the form of letter "S" rearwardly of the connection reinforcing member 8F and the rear portion of the side frame member 6 is located closer to the tractor body T. Whereas, the front portion of each connecting member 7 forwardly of the portion connected by the bolts 15 is bent in the form of letter "S" and is located away from the tractor body T to be opposed to the side frame member 6.

As described above, each connecting member 7 is attached to the rear supporting member 5 and the side frame member 6 at total three positions. In this regard, since the connection between the connecting member 7 and the side frame member 6 is binding connection by the binding plate 16, this connection is position adjustable. Instead, this connection may comprise bolt fastened connection. In the case of such bolt fastened connection, it is preferred that the bolt through holes be formed as elongated holes or slots for allowing adjustment of each attached position.

The connections of the members such as the side frame members 6, the connecting members 7, the binding plates 16, the connection reinforcing members 8F, 8R and so on are all bolt fastening connections for allowing detachable attachment. Hence, each of these members constituting the reinforcing frame 2 can be detached and attached, with the rear supporting members 5 and the loader attaching members 10 being kept attached to the tractor body T. Further, these members function to reinforce the tractor body T without being directly attached to this tractor body T.

Incidentally, the fore and aft, right and left and upper and lower positional relationships among the respective components in the foregoing embodiment are at their best when provided as illustrated in FIGS. 1 through 9. However, the present invention is not limited thereto. The respective components and the constructions may be modified in various manners and combinations thereof may be changed also.

For instance, the connection reinforcing member 8R may be disposed between the vicinity of the lower connecting portion 12 of the connecting member 7 and the fin plate 5D. The intermediate connection reinforcing member 8C may be disposed between the fit-in recess reinforcing member 9 and the rear axle casing T8. Further, instead of providing the intermediate connection reinforcing member 8C, the attaching plate 5C of the rear supporting member 5 may be bolt-fastened to the rear axle casing T8 to be connected to the connecting member 7.

The invention may be embodied in any other way than disclosed in the above detailed description without departing from the essential spirit thereof defined in the appended claims. All modifications apparent for those skilled in the art are intended to be encompassed within the scope of the invention defined by the claims.

What is claimed is:

1. A reinforcing frame construction having a roll over protect system (ROPS) and a rear axle casing projecting to the right and left from a tractor vehicle body, the construction comprising:

a pair of right and left loader attaching members for detachably attaching a front loader, the loader attaching members being connected to an intermediate portion of the vehicle body and projecting therefrom to the lateral sides;

a pair of right and left rear supporting members provided on the rear axle casing for supporting right and left legs of the ROPS, wherein each of said rear supporting members includes a first support element disposed between an upper face of the rear axle casing and a lower end of one of the ROPS legs and a second support element extending along one side of the rear axle casing and one of the ROPS legs, to support the ROPS by the rear axle casing to the tractor vehicle body; and a pair of right and left connecting members to which a rear implement is connected, the connecting members being fitted around the rear axle casing and being detachably connected to the rear supporting members:

wherein extension portions of the connecting members extending forwardly therefrom are detachably connected to the loader attaching members.

2. The reinforcing frame construction according to claim 1, wherein said rear supporting members and said connecting members are connected to each other at both front and rear regions of said rear axle casing.

3. The reinforcing frame construction according to claim 1, wherein at least one of the connection between the rear axle casing and the rear supporting members, the connection between the loader attaching members and the connecting members and the connection between the rear supporting members and the connecting members includes a connection reinforcing member for reinforcing said connection.

4. The reinforcing frame construction according to claim 1, wherein said connecting members are disposed between the vehicle body and said rear supporting members, each said connecting member being fitted to the rear axle casing from underneath via an upper-open fit-in recess of the connecting member; and a fit-in recess reinforcing member is provided for connecting front and rear peripheral portions of said fit-in recess fitted to the rear axle casing to an upper portion of the rear axle casing.

5. A reinforcing frame construction having a roll over protect system (ROPS) and a rear axle casing projecting to the right and left from a tractor vehicle body, the construction comprising:

a pair of right and left loader attaching members for detachably attaching a front loader, the loader attaching members being connected to an intermediate portion of the vehicle body and projecting therefrom to the lateral sides;

a pair of right and left rear supporting members provided on the rear axle casing for supporting right and left legs of the ROPS, wherein each of said rear supporting members includes a first support element disposed between an upper face of the rear axle casing and a lower end of one of the ROPS legs and a second support element extending along one side of the rear axle casing and one of the ROPS legs, to support the ROPS by the rear axle casing to the tractor vehicle body;

a pair of right and left side frame members having front ends thereof detachably attached to the loader attaching members and having rear ends thereof detachably attached to the rear supporting members; and a pair of right and left connecting members to which a rear implement is connected, the connecting members being fitted around the rear axle casing;

wherein said connecting members are detachably connected to said side frame members and said rear supporting members.

6. The reinforcing frame construction according to claim 5, wherein said right and left rear supporting members, said side frame members and said connecting members are bolt-connected together.

7. The reinforcing frame construction according to claim 5, wherein at least one of the connection between the rear axle casing and the rear supporting members, the connection between the loader attaching members and the side frame members and the connection between the rear supporting members and the connecting members includes a connection reinforcing member for reinforcing said connection.

8. The reinforcing frame construction according to claim 5, wherein said connecting members are disposed between the vehicle body and said rear supporting members, each said connecting member being fitted to the rear axle casing from underneath via an upper-open fit-in recess of the connecting member; and a fit-in recess reinforcing member is provided for connecting front and rear peripheral portions of said fit-in recess fitted to the rear axle casing to an upper portion of the rear casing.

9. The reinforcing frame construction according to claim 1, wherein each of said second support elements is directly connected to a back face of the rear axle casing and one of the ROPS legs.

10. The reinforcing frame construction according to claim 1, wherein said first and second support elements comprise two plates extending perpendicular and fixedly attached to each other.

11. The reinforcing frame construction according to claim 5, wherein each of said second support elements is directly connected to a back face of the rear axle casing and one of the ROPS legs.

12. The reinforcing frame construction according to claim 5, wherein said first and second support elements comprise two plates extending perpendicular and fixedly attached to each other.

* * * * *